(12) United States Patent
Le Roux et al.

(10) Patent No.: US 12,527,432 B2
(45) Date of Patent: *Jan. 20, 2026

(54) GRINDER DEVICE

(71) Applicant: McCormick & Company, Inc., Hunt Valley, MD (US)

(72) Inventors: Morgan Le Roux, Avignon (FR); Olivier Rattin, Althen-des-Paluds (FR)

(73) Assignee: McCormick & Company, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/608,589

(22) Filed: Mar. 18, 2024

(65) Prior Publication Data

US 2024/0298845 A1 Sep. 12, 2024

Related U.S. Application Data

(63) Continuation of application No. 17/527,838, filed on Nov. 16, 2021, now Pat. No. 11,930,962.

(60) Provisional application No. 63/147,621, filed on Feb. 9, 2021.

(51) Int. Cl.
*A47J 42/04* (2006.01)
*A47J 42/38* (2006.01)

(52) U.S. Cl.
CPC .............. *A47J 42/04* (2013.01); *A47J 42/38* (2013.01)

(58) Field of Classification Search
CPC .................. A47J 42/04; A47J 42/38
See application file for complete search history.

(56) References Cited

U.S. PATENT DOCUMENTS

| 5,176,329 | A | 1/1993 | De Coster et al. |
| 8,235,317 | B2* | 8/2012 | Wilson .................... A47J 42/10 241/169.1 |
| 10,912,416 | B2* | 2/2021 | Carapelli ................ A47J 42/10 |
| 2012/0006922 | A1 | 1/2012 | Wilson et al. |
| 2021/0276017 | A1 | 9/2021 | Verdú Francés |
| 2022/0175189 | A1* | 6/2022 | Davidson ................ A47J 42/38 |

FOREIGN PATENT DOCUMENTS

| BR | 8602278 | 6/2008 |
| CN | 209186447 | 8/2019 |
| FR | 2871674 | 12/2005 |
| WO | WO 2018/178438 | 10/2018 |
| WO | WO 2020/180665 | 9/2020 |

OTHER PUBLICATIONS

International Search Report and Written Opinion issued in Corresponding PCT Application No. PCT/US2021/059522, dated Feb. 28, 2022.

* cited by examiner

*Primary Examiner* — Mohammed S. Alawadi
(74) *Attorney, Agent, or Firm* — Norton Rose Fulbright US LLP

(57) ABSTRACT

A grinder device is provided. The grinder device may include a container, a cap assembly configured to be friction-fit to the container such that the cap assembly is removably lockable to the container, and a grinding mill disposed within the cap assembly to perform a grinding operation of condiment disposed in the container. The grinding mill may include a movable grinder portion and a fixed grinder portion that are rotatable relative to each other, and the fixed grinder portion is engageable with the container to permit relative rotation between the cap assembly and the container.

13 Claims, 15 Drawing Sheets

GRINDER DEVICE

CROSS-REFERENCE TO RELATED APPLICATIONS

This application is a continuation of U.S. patent application Ser. No. 17/527,838, filed Nov. 16, 2021, which claims the benefit of priority of U.S. Provisional Application No. 63/147,621, filed Feb. 9, 2021, both of which are hereby incorporated by reference in their respective entireties.

TECHNICAL FIELD

The present disclosure generally relates to the field of spice grinders, and specifically closures for such grinders.

BACKGROUND

Several types of grinders for grinding condiments, such as pepper, salt, and berries, are known. For example, a conventional grinding device may include a bottle to store the un-ground condiment and a cap attached to the bottle where the cap incorporates therein a mill for grinding the condiment. While some caps are known to be attached, in the traditional sense, to an upper end of the bottle, other caps are known to have a configuration in which the cap serves as a base support for the grinder device. Closure systems for such grinding devices are also known. The closure systems can be non-removable one-way snap-fit or friction-fit arrangements in which beaded portions of one of the cap and the bottle are positioned within an annular groove of the other of the cap and the bottle to prevent disengagement or tampering of the connection. Various male and female threaded arrangements between the cap and the bottle are also known.

SUMMARY OF THE DISCLOSURE

However, there are drawbacks with such conventional designs. With respect to the non-removable closure designs, they are intended only for a single use of the grinder by consumers. That is, when the supply of condiment has been depleted from use of the grinder, the grinder must be discarded and replaced with a new one rather than being re-used and re-supplied with new condiment. Additionally, if the cap or the condiment are compromised in some manner (e.g., if a crack forms in the cap that prevents grinding from being performed or permits undesirable foreign bodies such as moisture, dirt, dust, other substances to infiltrate and contaminate the grinder), the only solution is to discard the defective grinder and replace it with a new one. With respect to removable closure-designs, such as the male and female threaded arrangements, it is difficult to visually confirm secure attachment and/or detect tampering.

Thus, there is a need to develop a grinder and related closure that prevents unnecessary waste, facilitates easy and secure removal/attachment of the cap to the bottle, facilitates easy replacement/interchangeability of parts within a family of products, and encourages recyclability of the grinder for multi-re-use and re-fill opportunities. There is also a need to develop a closure having a robust removable, lockable connection between the cap and the bottle that can withstand separation during a grinding operation, but also permits easy removal of the cap from the bottle for inspection of the component parts and/or re-filling of the condiment into the bottle. There is also a need to develop a closure that readily confirms secure attachment of the cap to the bottle and is tamper resistant. The embodiments described herein address the above-mentioned needs.

According to an exemplary, non-limiting embodiment a grinder device is provided. The grinder device may include a container, a cap assembly configured to be friction-fit to the container such that the cap assembly is removably lockable to the container, and a grinding mill disposed within the cap assembly to perform a grinding operation of condiment disposed in the container. The grinding mill may include a movable grinder portion and a fixed grinder portion that are rotatable relative to each other, and the fixed grinder portion is engageable with the container to permit relative rotation between the cap assembly and the container.

In embodiments, the container may include an annular neck and a supply base for supplying condiments. The cap assembly may include a resiliently deformable grinder housing that is configured to be friction-fit to the annular neck of the container such that the cap assembly is removably lockable to the container, and the annular neck and grinder housing define a closure that secures the cap assembly to the container and permit relative rotation between the cap assembly and the container.

In embodiments, the grinder housing houses the grinding mill therein and slightly tapers from an upper side to a lower side, and may include a plurality of lock protrusions on a lower side of an inner circumferential surface thereof. The plurality of lock protrusions may be disposed radially at spaced intervals along the inner circumferential surface of the grinder housing.

In embodiments, each lock protrusion of the plurality of lock protrusions may include a radially curved lock projection that extends radially along the inner circumferential surface of the grinder housing and a plurality of axially extending finger projections that project downward from a lower side of the curved lock projection. The plurality of axially extending finger projections are configured to contact and slide over the annular neck to permit attachment of the cap assembly to the container.

In embodiments, the annular neck may include an upper ring section, an upper annular shoulder, a lower annular shoulder, and a recessed groove defined between the upper and lower annular shoulders. The recessed groove is configured to accommodate a plurality of lock protrusions protruding from an inner circumferential surface of the grinder housing such that, when the cap assembly is attached to the container, the plurality of lock protrusions project radially inward into the recessed groove to secure the cap assembly to the container while permitting relative rotation between the cap assembly and the container.

In embodiments, the recessed groove may include a plurality of lock beads that project radially outward at spaced intervals from an outer circumferential surface of the recessed groove, and when the cap assembly is secured to the container and the lock protrusions are radially aligned with the lock beads, the lock beads prevent removal of the cap assembly from the container.

In embodiments, the cap assembly may include a cap assembly alignment indicator and the container may include a container alignment indicator, and when the cap assembly is secured to the container, and the cap assembly and container alignment indicators are aligned with each other, the cap assembly is switched from a cap assembly locked position to a cap assembly removal position.

In embodiments, when the cap assembly and the container are in the cap assembly removal position, lock protrusions provided on an inner circumferential surf ace of the grinder housing are positioned in a space between radially spaced lock beads extending along the annular neck.

In embodiments, when the cap assembly and the container are in the cap assembly locked position, lock protrusions provided on an inner circumferential surface of the grinder housing are positioned so as to align with and face in a radial direction lock beads extending along the annular.

In embodiments, when the cap assembly is secured to the container, and the cap assembly is in a cap assembly removal position, the cap assembly and the container are configured to receive a separation force to place the cap assembly in an initial separation position such that on a front side of the grinder device, one of the plurality of lock protrusions on the inner circumferential surf ace of the grinder housing contacts the upper annular shoulder of the annular neck and slides upwardly and radially outwardly toward an outermost circumferential edge of the upper annular shoulder to remove the one of the plurality of lock protrusions from the recessed groove and position the cap assembly in a tilted position relative to the container, and on a rear side of the grinder device, opposite to the front side thereof, a lower peripheral rim portion of the grinder housing is urged downward to abut into an upper surface of the lower annular shoulder and another of the plurality of lock protrusions is retained in the recessed groove so as to restrict the cap assembly from being removed from the container.

In embodiments, when the cap assembly and the container are in the initial separation position, and a rotation force and another separation force are applied, the another of the plurality of lock protrusions retained in the recessed groove contacts and slides upwardly and radially along one of the plurality of lock beads to resiliently deform the grinder housing radially outward to permit complete separation of the cap assembly from the container.

In embodiments, when the cap assembly is secured to the container, and the cap assembly is in a cap assembly locked position: one of the plurality of protrusions provided on the inner circumferential surface of the grinder housing faces one of the plurality of lock beads in a position radially outward therefrom, and the cap assembly and the container are configured to resist separation such that when a separation force is generated to separate the cap assembly from the container: on a side of the cap assembly receiving the separation force, the one of the plurality of lock protrusions contacts a lower surface of the upper annular shoulder and becomes wedged in the recessed groove between an upper surface of the one of the plurality of lock beads and the lower surface of the upper annular shoulder, and on an opposite side of the cap assembly receiving the separation force, another one of the plurality of lock protrusions is pressed downwardly and radially inwardly to contact another one of the plurality of lock beads, and a lower peripheral rim portion of the grinder housing is urged downward to abut into an upper surface of the lower annular shoulder thereby preventing the one of the plurality of lock protrusions on the side of the cap assembly receiving the separation force sufficient space to slide upwardly and radially outward over the upper annular shoulder and permit separation of the cap assembly from the container.

According to another exemplary, non-limiting embodiment a closure for removably locking a cap assembly to a container is provided. The closure may include a plurality of lock protrusions, provided on a lower side of an inner circumferential surface of a grinder housing of the cap assembly, that are disposed radially at spaced intervals along the inner circumferential surface of the grinder housing, and an annular neck of the container that may include an upper annular shoulder, a lower annular shoulder, and a recessed groove defined between the upper and lower annular shoulders. The recessed groove is configured to accommodate the plurality of lock protrusions protruding from the inner circumferential surf ace of the grinder housing such that, when the cap assembly is attached to the container, the plurality of lock protrusions project radially inward into the recessed groove to secure the cap assembly to the container while permitting relative rotation between the cap assembly and the container.

In embodiments, each lock protrusion of the plurality of lock protrusions may include a radially curved lock projection that extends radially along the inner circumferential surface of the grinder housing, and a plurality of axially extending finger projections that project downward from a lower side of the curved lock projection.

In embodiments, the recessed groove may include a plurality of lock beads that project radially outward at spaced intervals from an outer circumferential surface of the recessed groove, and when the closure is in a locked position, the lock protrusions are radially aligned with the lock beads and removal of the cap assembly from the container is prevented.

In embodiments, when the closure is in a removal position, the plurality of lock protrusions provided on the inner circumferential surface of the grinder housing are positioned in a space between radially spaced lock beads extending along the annular neck.

In embodiments, when the closure is in a removal position, and the cap assembly and the container receive a separation force to place the cap assembly, the closure is in an initial separation position such that: on a side of the closure receiving the separation force, one of the plurality of lock protrusions on the inner circumferential surface of the grinder housing contacts the upper annular shoulder of the annular neck and slides upwardly and radially outwardly toward an outermost circumferential edge the upper annular shoulder to remove the one of the plurality of lock protrusions from the recessed groove and position the cap assembly in a tilted position relative to the container, and on another side of the closure opposite of the side receiving the separation force, a lower peripheral rim portion of the grinder housing is urged downward to abut into an upper surface of the lower annular shoulder and another of the plurality of lock protrusions is retained in the recessed groove so as to restrict the cap assembly from being removed from the container.

In embodiments, when the closure is in the initial separation position, and a rotation force and another separation force are applied to the cap assembly and the container, the another of the plurality of lock protrusions retained in the recessed groove contacts and slides upwardly and radially along one of the plurality of lock beads to resiliently deform the grinder housing radially outward to permit complete separation of the closure and removal of the cap assembly from the container.

In embodiments, when the closure is in a locked position such that the cap assembly is secured to the container: one of the plurality of protrusions provided on the inner circumferential surface of the grinder housing faces one of the plurality of lock beads in a position radially outward from the same, and the closure is configured to resist separation such that when a separation force is generated to separate the cap assembly from the container: on a side of the closure receiving the separation force, the one of the plurality of lock protrusions contacts a lower surface of the upper annular shoulder and becomes wedged in the recessed groove between an upper surface of the one of the plurality of lock beads and the lower surface of the upper annular shoulder, and on another side of the closure opposite of the side receiving the separation force, another one of the plurality of lock protrusions is pressed downwardly and radially inwardly to contact another one of the plurality of lock beads, and a lower peripheral rim portion of the grinder housing is urged downward to abut into an upper surface of the lower annular shoulder thereby preventing the one of the plurality of lock protrusions on the side of the cap assembly receiving the separation force sufficient space to slide upwardly and radially outward over the upper annular shoulder and permit separation of the closure and removal of the cap assembly from the container.

These and additional embodiments are further described below.

DETAILED DESCRIPTION

The particulars shown herein are by way of example and for purposes of illustrative discussion of the various embodiments of the present invention only and are presented for purposes of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Advantages of the invention will be set forth in part in the descriptions which follow, and in part will be readily understood from the descriptions, or may be learned by practice of the invention. It is to be understood that both the foregoing general description and the following detailed description are exemplary and explanatory only and are not restrictive of the invention, as claimed.

Figure 1:
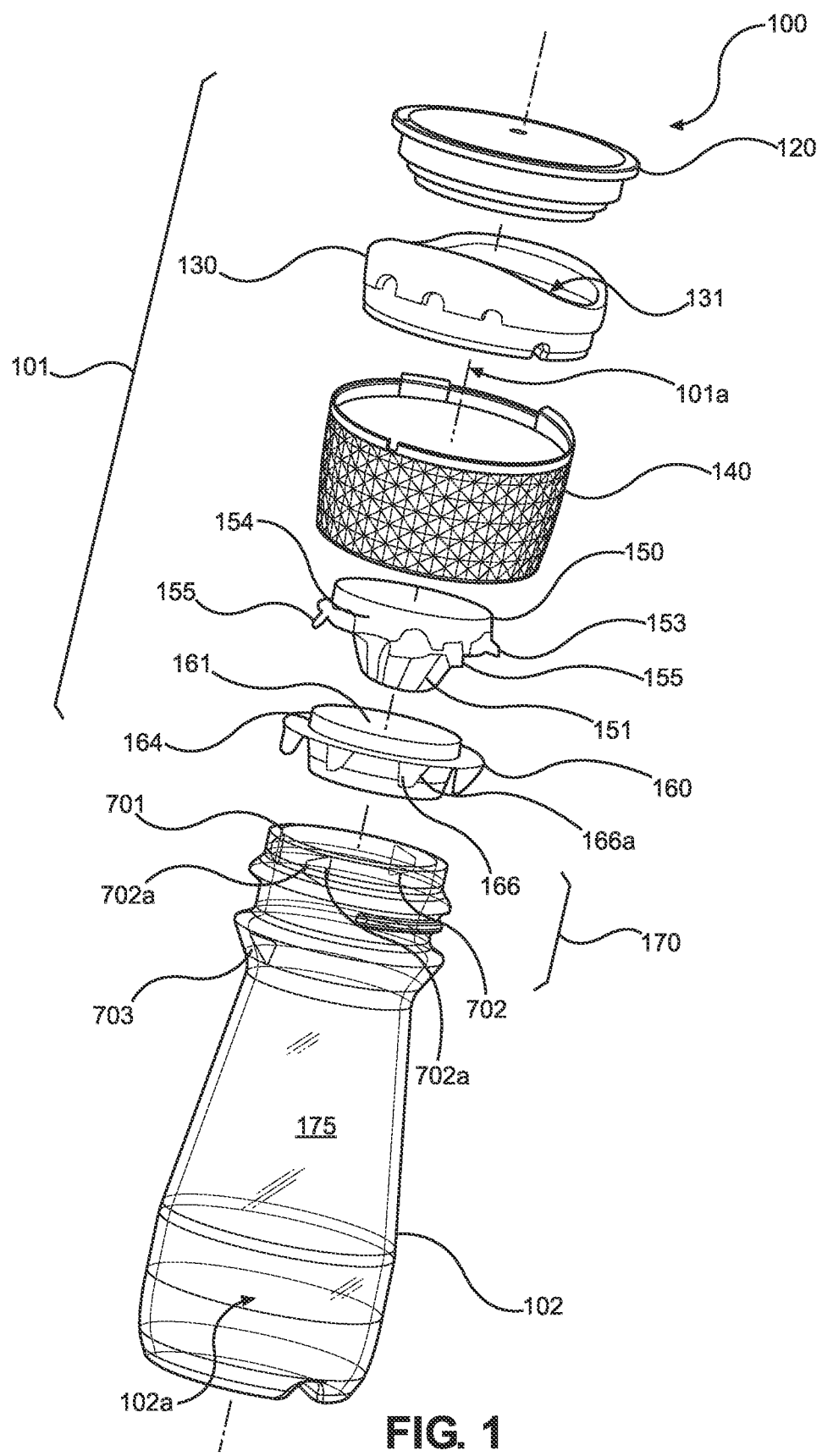
FIG. 1 is an exemplary exploded view of the grinder device, according to non-limiting embodiments of the present application.

FIG. 1 illustrates an exemplary exploded view of a grinder device 100. The grinder device 100 includes a cap assembly 101 that is removably attached to a container 102. When the cap assembly 101 is securely attached to the container 102, the cap assembly 101 is rotatable (about a rotation axis 101a corresponding to a center axis 102a of the container 102) to spin relative to the container 102 to grind grain-like condiments such as pepper, salt, and berries. The cap assembly 101 and the container 102 may be formed by various suitable materials for use in the food preparation environment taking into account carbon footprint and sustainability considerations. The cap assembly 101 (and its component parts) may be formed to include components having one or more types of food-grade thermoplastics (for example, but not limited to, polyoxymethylenes, polyacetal copolymers, polyacetal homopolymers, mineral loaded polypropylene homopolymers, polybutylene terephthalates, and/or blended polypropylene glass fibers). The cap assembly 101 may also incorporate along with the one or more thermoplastics, a ceramic material. The container 102 may be formed of, for example, a food-grade tempered glass or a polyethylene terephthalate. It should be noted that the above-mentioned material choices are exemplary and should not be construed as limiting as other known food-grade materials are also contemplated and within the intended scope of the present application.

The cap assembly 101 includes a cover 120, a grind adjuster 130, a grinder housing 140, and a movable grinder portion 150 and a fixed grinder portion 160, which together define a mill integrated within the cap assembly 101. The container 102 includes an annular neck 170 and a supply base 175 for supplying condiments. The grinder housing 140 and the annular neck 170 define a closure 800. The cover 120, the grind adjuster 130, and the grinder housing 140 are preferably polypropylene-type thermoplastics having deformable resiliency, and the movable grinder portion 150 and the fixed grinder portion 160 are preferably polyoxymethylene-type thermoplastics having high stiffness, high hardness, low friction, and high rigidity compared to the polypropylene-type thermoplastics thereby minimizing the possibility of micro-plastics forming during a grinding operation and enhancing durability and the usable shelf-life of the grinder 100.

Figure 2A:
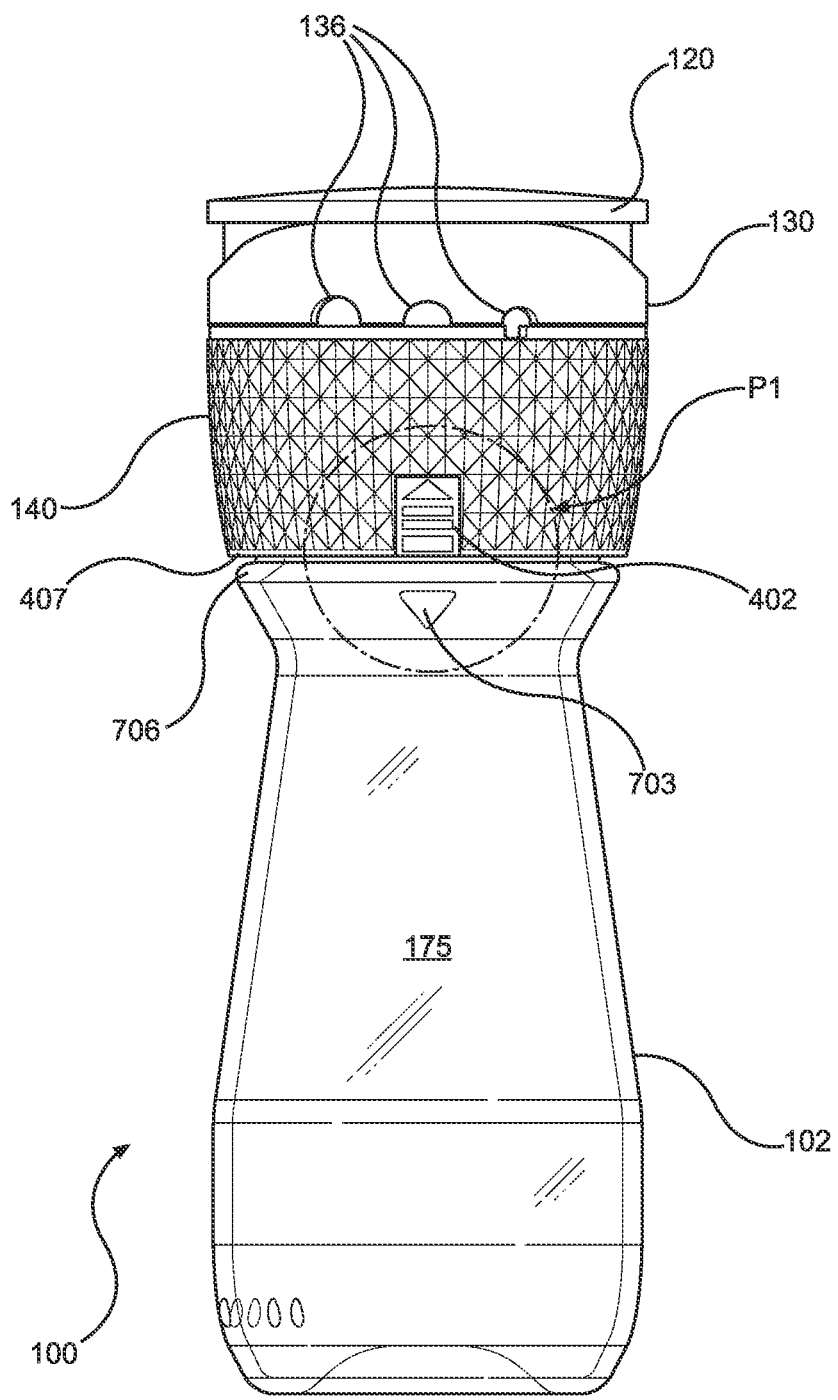
FIG. 2A is an exemplary front perspective view of a grinder device in a cap assembly removal position, according to non-limiting embodiments of the present application.
Figure 2B:
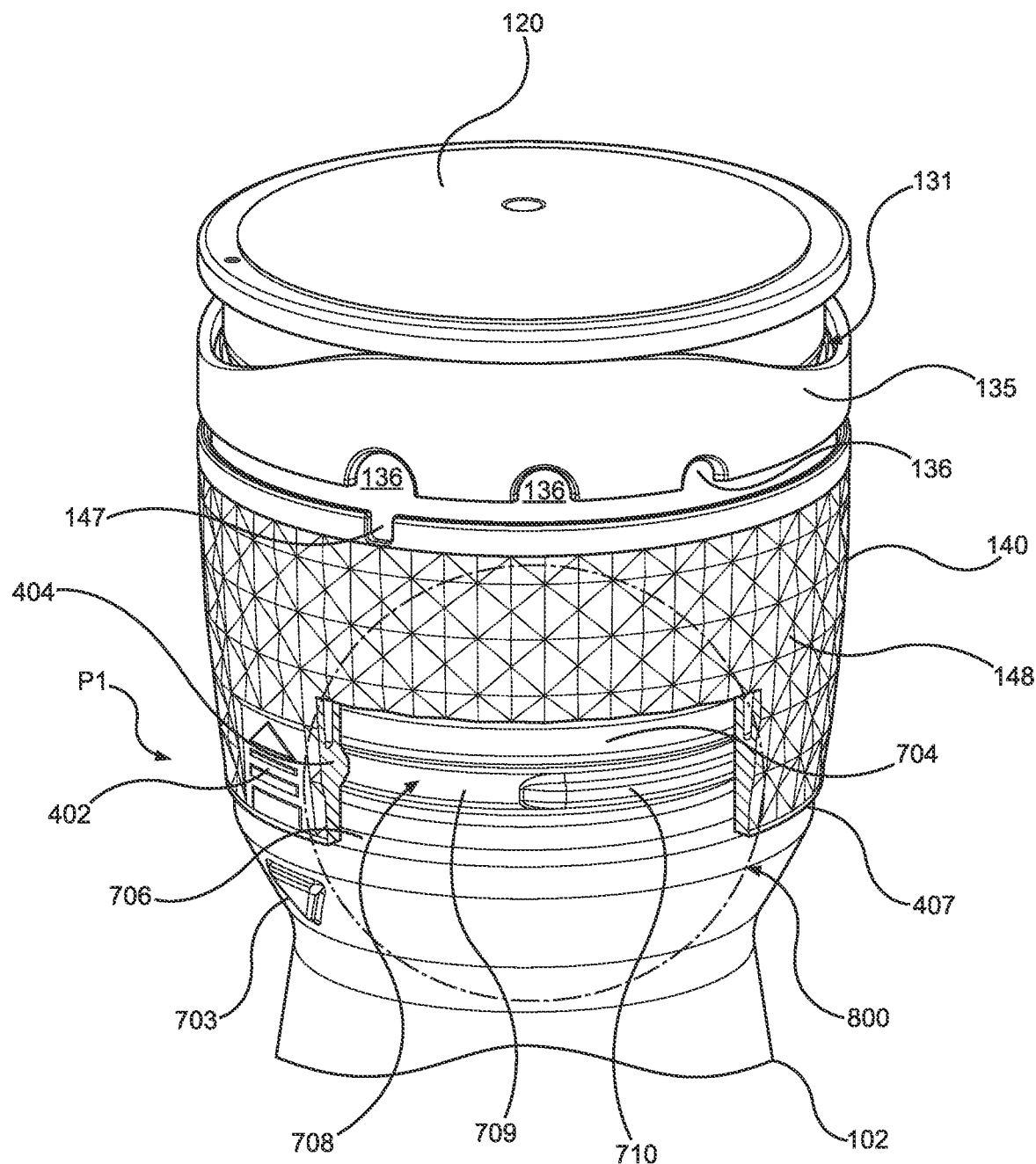
FIG. 2B is an exemplary partial cut-away perspective view of a closure in the cap assembly removal position, according to non-limiting embodiments of the present application.
Figure 3A:
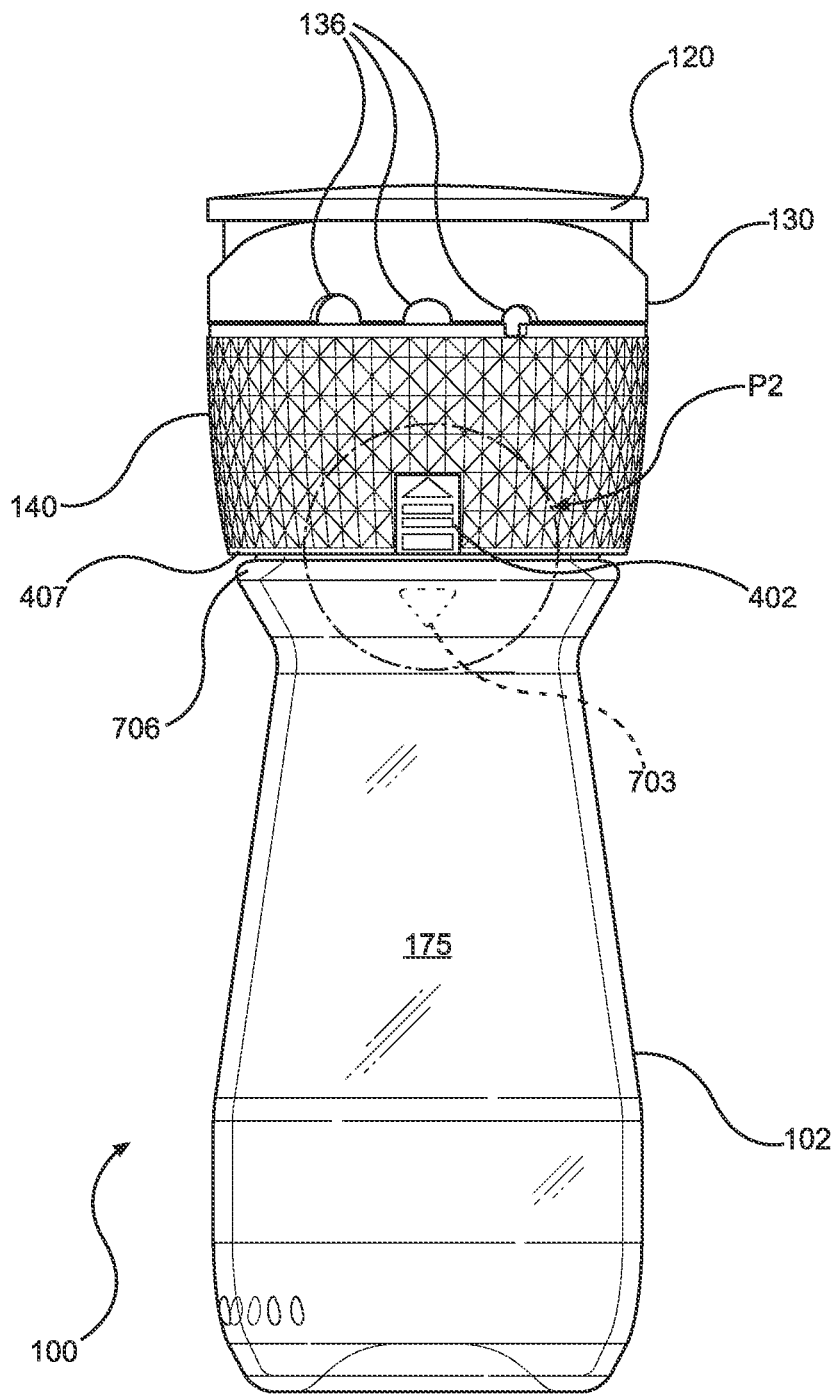
FIG. 3A is an exemplary side perspective view of a grinder device in a cap assembly lock position, according to non-limiting embodiments of the present application.
Figure 3B:
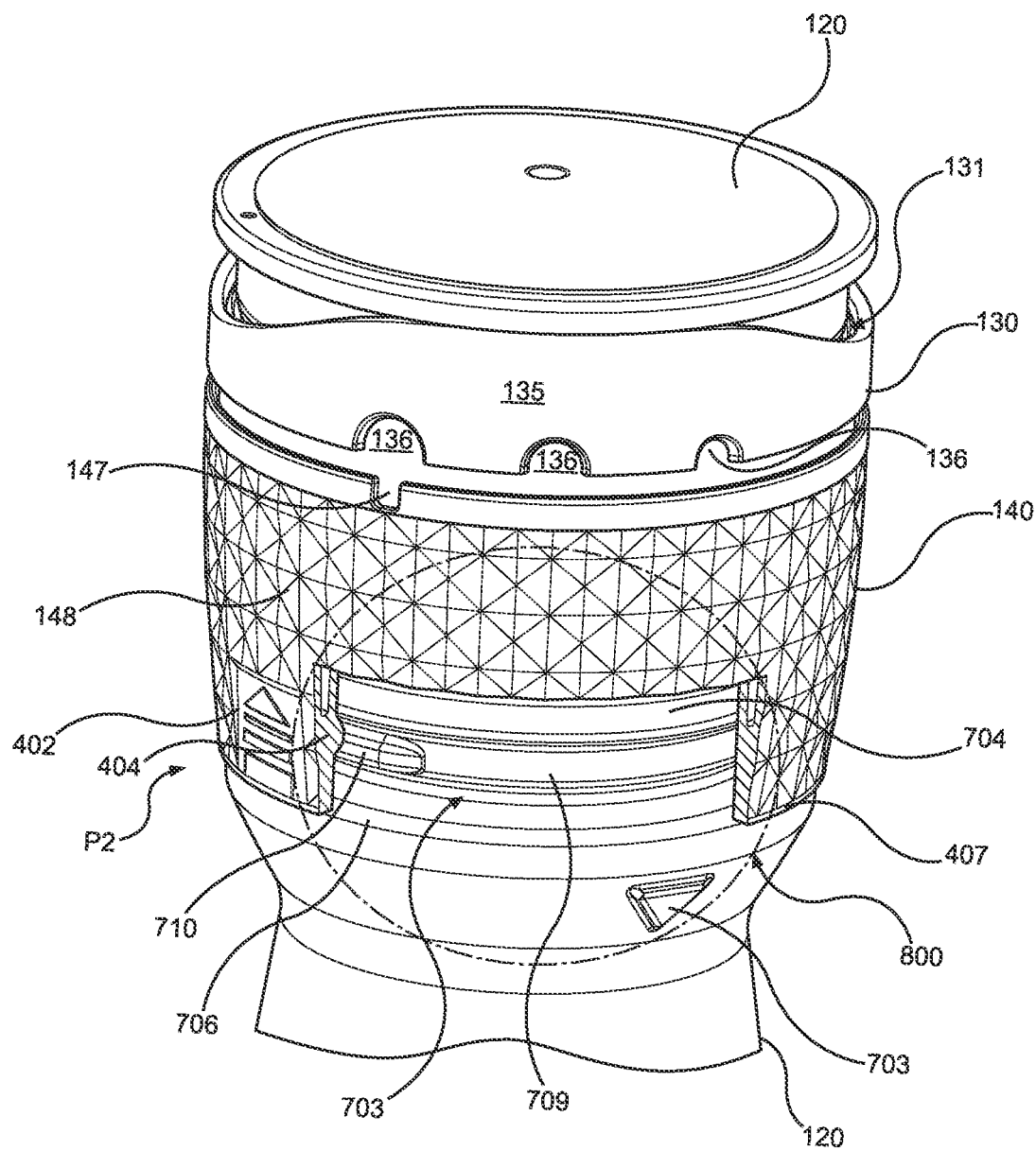
FIG. 3B is an exemplary partial cut-away perspective view of a closure in the cap assembly lock position, according to non-limiting embodiments of the present application.

FIGS. 2A and 3A, respectively, show front perspective views of the grinder device 100 in a cap assembly removal position P1 and in a cap assembly lock position P2. FIGS. 2B and 3B, respectively, show magnified partial cut-away perspective views of the closure 800 in the cap assembly removal position P1 and in the cap assembly lock position P2. Further detail regarding the closure 800 is discussed below.

<Cover>

Figure 4A:
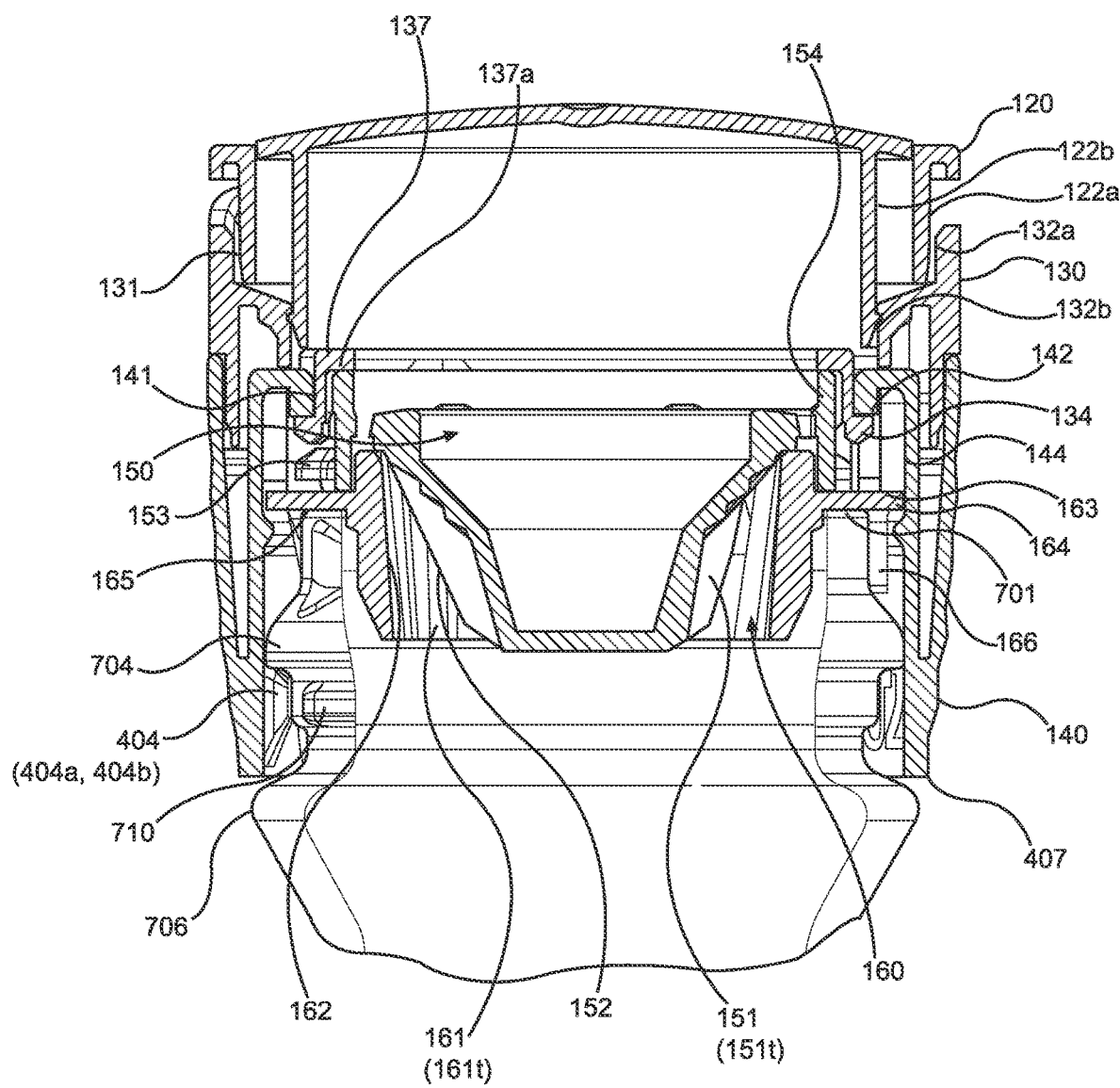
FIG. 4A is an exemplary cross-sectional view of a closure in a cap assembly lock position with the cap assembly in a fine grind position, according to non-limiting embodiments of the present application.
Figure 4B:
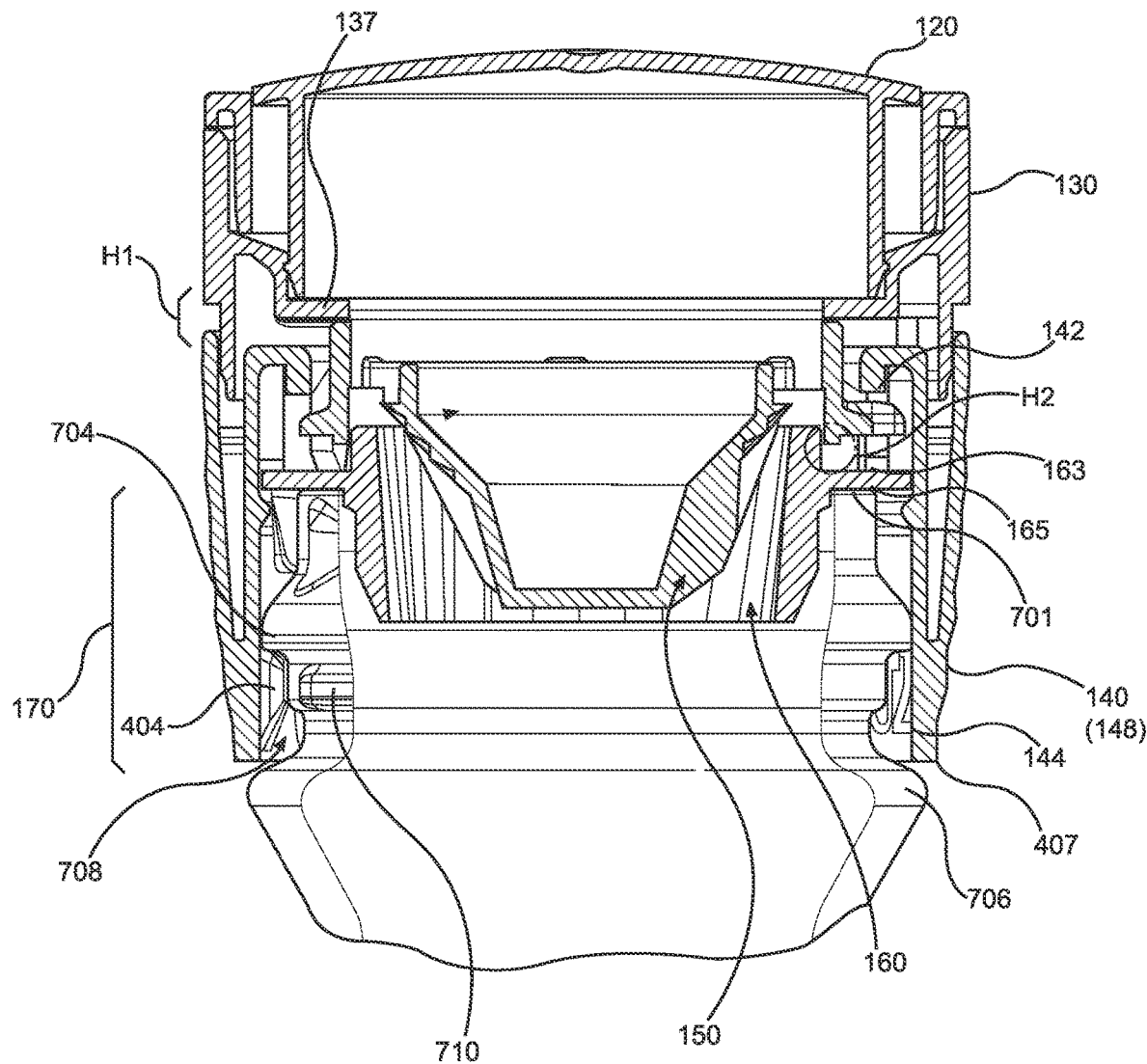
FIG. 4B is an exemplary cross-sectional view of a closure in a cap assembly lock position with the cap assembly in a course grind position, according to non-limiting embodiments of the present application.

The cover 120 is removably attached to the cap assembly 101. As shown in FIGS. 4A and 4B, the cap 120 includes concentric annular rings 122a, 122b that project downward from an upper side of the cap 120 such that at least one of the annular rings 122a, 122b can be received through an upper-side opening 131 of the grind adjuster 130 and friction-fit into an inner surface 132a, 132b of the grind adjuster 130. The cover 120 is provided to be removed to permit condiments ground from a grinding operation to be dispensed from the grinder device 100. When the grinder device is not in use, the cover is replaced onto the grind adjuster 130.

<Grind Adjuster>

The grind adjuster 130 sets the grind setting for the grinder device 100 and is rotatable relative to the grinder housing 140 (about the center axis 102a of the container 102) to permit the grinding of the grain-like condiments in a plurality of selectable sizes. In embodiments, the grind adjuster 130 can set the grinder device 100 to perform: a course grind, a medium grind, and a fine grind. As shown in FIGS. 4A and 4B, the grind adjuster 130 includes at least one lock tab 134 that project downward from an upper side of the grind adjuster 130 to be received through an upper-side opening 141 of the grinder housing 140. The at least one lock tab 134 engages an inner inclined surface 142 of the grinder housing 140 that is provided on an inner circumferential surface 144 of the grinder housing 140.

The lock tab 134 slidably contacts the inclined surface 142 such that when the grind adjuster 130 is rotated, the lock tab 134 slides upward or downward along the inclined surface 142 to a grind setting desired by a user. It is noted that the rotary movement of the grind adjuster 130 relative to the grinder housing 140 corresponds to not only a vertical spacing adjustment H1 between the grind adjuster 130 and the grinder housing 140, but the relative rotation also corresponds to a vertical spacing adjustment H2 between the movable grinder portion 150 and the fixed grinder portion 160 thereby enabling the selection of one of the course grind, the medium grind, and the fine grind.

The grind adjuster 130 further includes on an outer circumferential surface 135 thereof a plurality of grind setting indicators 136 or notches each representing to a user one of the course grind, the medium grind, and the fine grind setting. In embodiments, each grind setting indicator 136 has a different size so as to correspond to one of the grind settings. While three grind setting indicators are depicted, fewer or more indicators are contemplated by the present disclosure.

<Grinder Housing—Part I>

The grinder housing 140 includes a grind setting position indicator 147 on an outer circumferential surface 148 thereof. The grind setting position indicator 147 is positioned on the grinder housing 140 such that it can be vertically aligned with one of the grind setting indicators 136 above it on the grind adjuster 130 when the grind adjuster 130 is rotated relative to the grinder housing 140 to one of the grind positions indicated by each of the grind setting indicators 136. The grind setting position indicator 147 indicates the grind selection position set by the user. Thus, as shown in FIGS. 2B and 3B, for example, if the grind setting position indicator 147 is aligned with the largest sized grind setting indicator 136, then the grind setting position indicator 147 will be vertically aligned with that grind setting indicator and indicate that the grinder device 100 is in the coarse grind position.

<Mill><Grinder>

<Movable Grinder Portion>

The movable grinder portion 150 and the fixed grinder portion 160 define a grinder or a mill that performs the grinding of the grain-like condiment. As shown in FIGS. 4A and 4B, the movable grinder portion 150 includes a teeth section 151 having a plurality of radially disposed teeth 151t provided at an outer circumferential surface 152 of the movable grinder portion 150. The teeth 151t face a teeth section 161 of the fixed grinder portion 160, which includes a plurality of teeth 161t provided at an inner circumferential surface 162 of the fixed grinder portion 160. The teeth section 161 surround the teeth section 151 in a concentric arrangement and rotate relative to each other to enable the grinder device 100 to grind (between the teeth 151t, 161t) the grain-like condiments stored in the supply base 175.

The movable grinder portion 150 is provided with a plurality of radial tabs 153 extending from an outer periphery ring 154 of the movable grinder portion 150. The radial tabs 153 can become trapped between axial ribs 149 formed on the inner circumferential surface 144 of the grinder housing 140 to prevent the movable grinder portion 150 from rotating during a grinding operation. The radial tabs 153 are disposed between adjacent axial ribs 149 with a predetermined spacing between the radial tab 153 and the axial rib 149 so as to permit limited rotatory movement between the two components.

The outer periphery ring 154 of the movable grinder portion 150 abuts a lower face 137a of an inner annular flange 137 of the grind adjuster 130. This configuration enables the movable grinder portion 150 to follow the upward and downward axial displacement of the grind adjuster 130 when the lock tab 134 slides upward or downward along the inclined surface 142 of the grinder housing 140.

To stably support the movable grinder portion 150 against the lower face 137a of the inner annular flange 136 of the grind adjuster 130, the movable grinder portion 150 is provided with a plurality of resilient support tabs 155 that extend radially and downward from the outer periphery ring 154 between radial tabs 153 in an alternating manner around the outer periphery ring 154. The resilient support tabs 155 contact an upper surface 163 of an outer annular flange 164 of the fixed grinder portion 160. With this configuration the resilient support tabs 155 keep the movable grinder portion 150 in continuous contact with the grind adjuster 130, regardless of the grinder adjuster's 130 position relative to the grinder housing 140.

In other words, because the movable grinder portion 150 is positioned between the grind adjuster 130 and the fixed grinder portion along the rotation axis 101a of the cap assembly 101 such that an upper side of the movable grinder portion 150 abuts a lower side of the grind adjuster 130, and a lower side of the movable grinder portion 150 resiliently (or elastically) contacts an upper side of the fixed grinder portion 160, when the grinder adjuster 130 is rotated to set a grind setting from the grinder device 100, the resilient support tabs 155 enable the movable grinder portion 150 to either be forced downward by the contact with the grind adjuster 130 when the vertical spacing between the grind adjuster 130 and the grinder housing 140 is small (i.e., fine grind setting), or urged upward when the vertical spacing between the grind adjuster 130 and the grinder housing 140 is large (i.e., coarse grind or medium grind setting). The resilient support tabs 155 also maintain the appropriate radial and vertical spacing between the teeth 151t of the movable grinder portion 150 and the teeth 161t of the fixed grinder portion 160.

<Fixed Grinder Portion>

The fixed grinder portion 160 is disposed below the movable grinder portion 150 in an axial direction of the cap assembly 101 between the fixed grinder portion 160 and the container 102 such that at least a portion of the movable grinder portion 150 is nested in the fixed grinder portion 160. In particular, a portion of the teeth section 151 projects through an opening of the teeth section 161 in the axial direction of the cap assembly 101 toward the supply base 175. This arrangement enables a compact design for the cap assembly 101, as well as grinding or milling of the grain-like condiments.

When the cap assembly 101 is attached to the container 102, a lower surface 165 of the fixed grinder portion's 160 outer annular flange 164 abuts an upper rim 701 of the annular neck 170. A plurality of axially extending contact projections 166 are radially disposed at spaced intervals along a peripheral edge of the annular flange 164. Each contact projection 166 includes an abutment surface 166a disposed along a rotation direction of the fixed grinder portion 160. The abutment surfaces 166a are configured to abut rotation stopper projections 702a extending from an outer circumferential surface 702b of an upper ring section 702 of the annular neck 170 (above an upper annular shoulder 704 discussed in detail below). The rotation stopper projections 702a are radially disposed at spaced intervals along the outer circumferential surface 702b of the upper ring section 702.

When the cap assembly 101 is attached to the container 102, the rotation stopper projections 702a permit limited clockwise and counterclockwise rotation of the fixed grinder portion 160 until any one of the abutment surfaces 166a contacts a stopper surface 702a1 of one of the rotation stopper projections 702a. This configuration immobilizes or fixes the fixed grinder portion 160 relative to the container 102 to permit grinding and relative rotation between the fixed grinder portion 160 and the movable grinder portion 150. In other words, this configuration permits the fixed grinder portion 160 and the container 102 to rotate relative to the movable grinder portion 150 and the other components of the cap assembly 101 for a grinding operation.

<Grinder Housing—Part II>

As shown in FIGS. 2A-3B, and 5A, the grinder housing 140 includes on the outer circumferential surface 148 thereof a cap assembly alignment indicator 402, which is provided to align (in the axial direction of the cap assembly 101) with a container alignment indicator 703 provided on the container 102 in the vertical direction based on radial adjustments of one or both of the cap assembly 101 and the container 102.

The grinder housing 140 is generally cylindrical in shape and slightly tapers from an upper side to a lower side such that an opening diameter of the upper side of the grinder housing 140 is larger than an opening diameter of the lower side of the grinder housing 140. The grinder housing 140 is resiliently deformable in that it may be slightly deformed to enable the cap assembly 101 of which it is a part to be friction-fit (snap-fit) onto or removable from the annular neck 170 of the container 102.

Figure 5A:
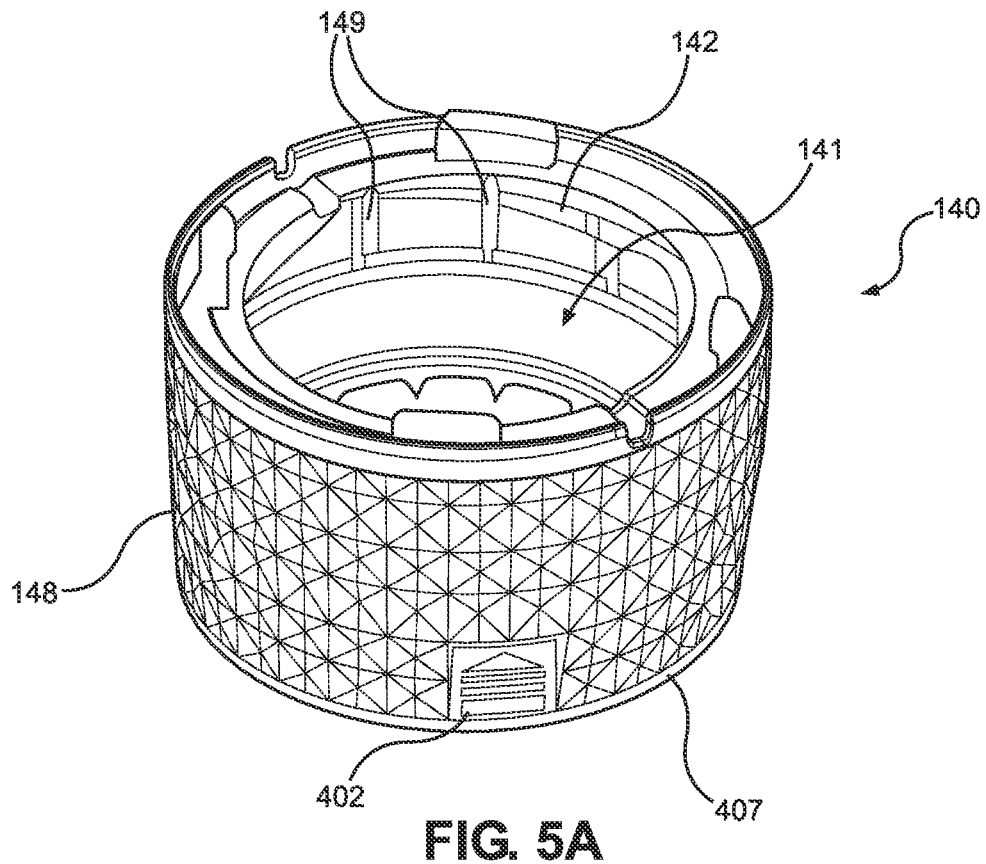
FIG. 5A is an exemplary upper-side perspective view of a grinder housing, according to non-limiting aspects of the present application.
Figure 5B:
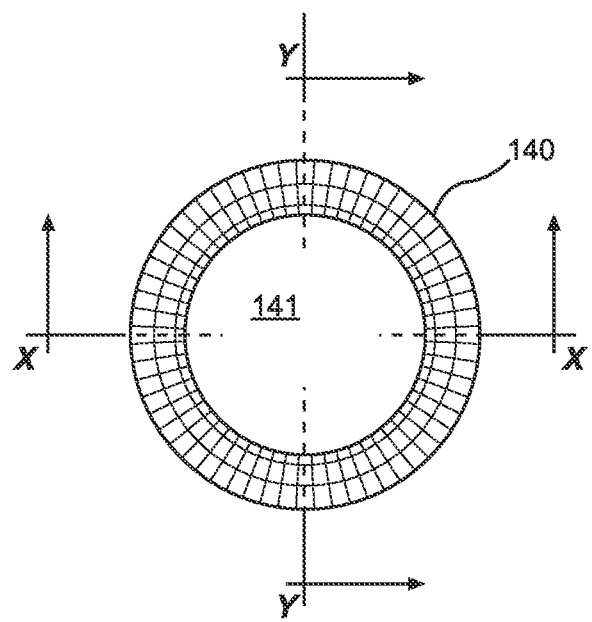
FIG. 5B is an exemplary top plan view of the grinder housing shown in FIG. 4A, according to non-limiting embodiments of the present application.
Figure 6A:
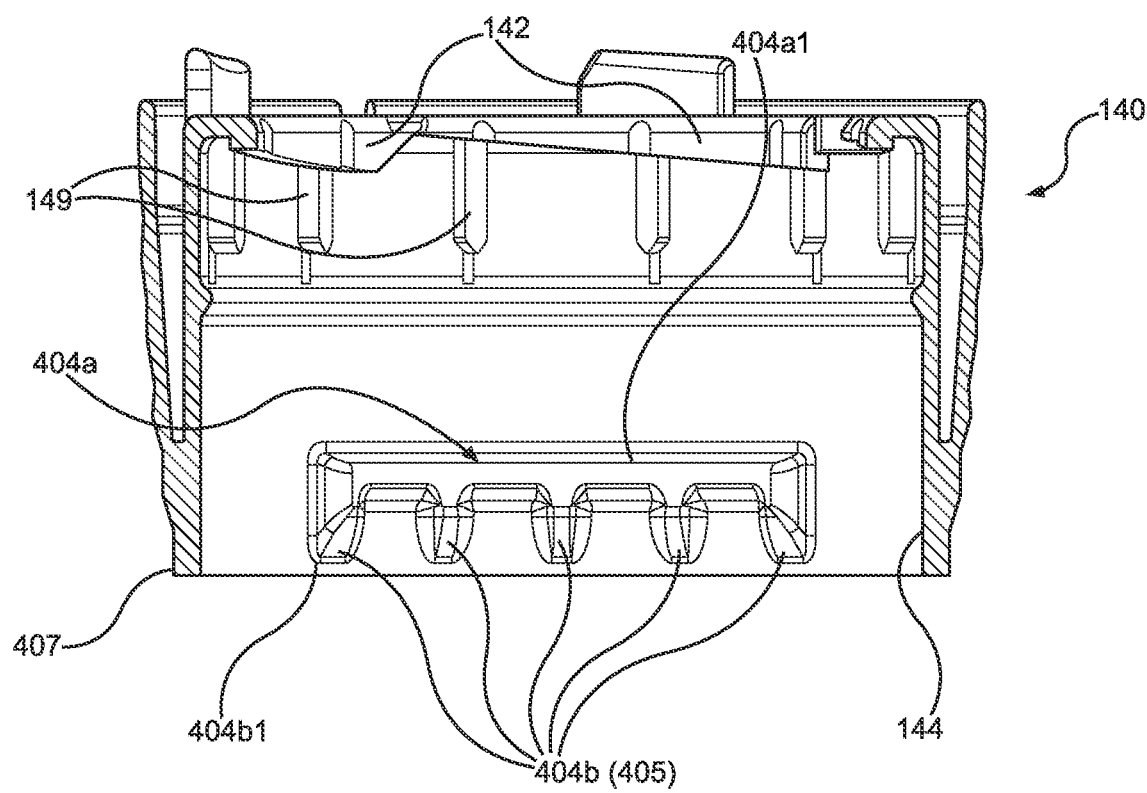
FIG. 6A is an exemplary cross-sectional view of the grinder housing along line X-X shown in FIG. 5B, according to non-limiting embodiments of the present application.
Figure 6B:
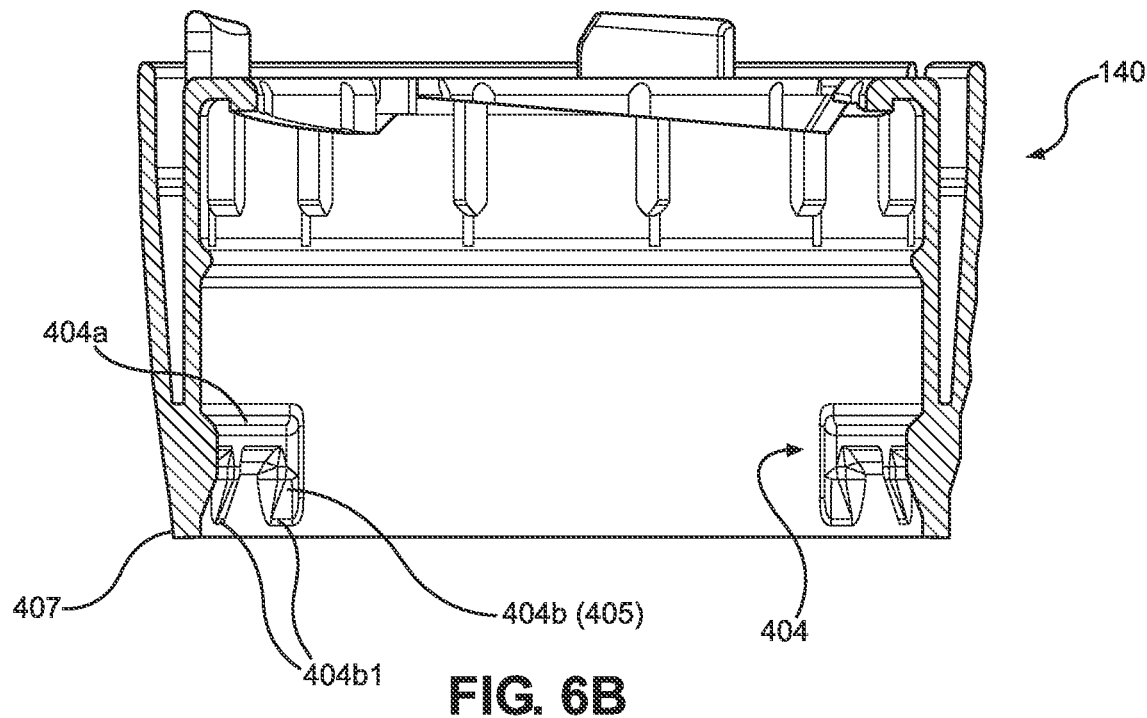
FIG. 6B is an exemplary cross-sectional view of the grinder housing along line Y-Y shown in FIG. 5B, according to non-limiting embodiments of the present application.
Figures 7A, 7B:
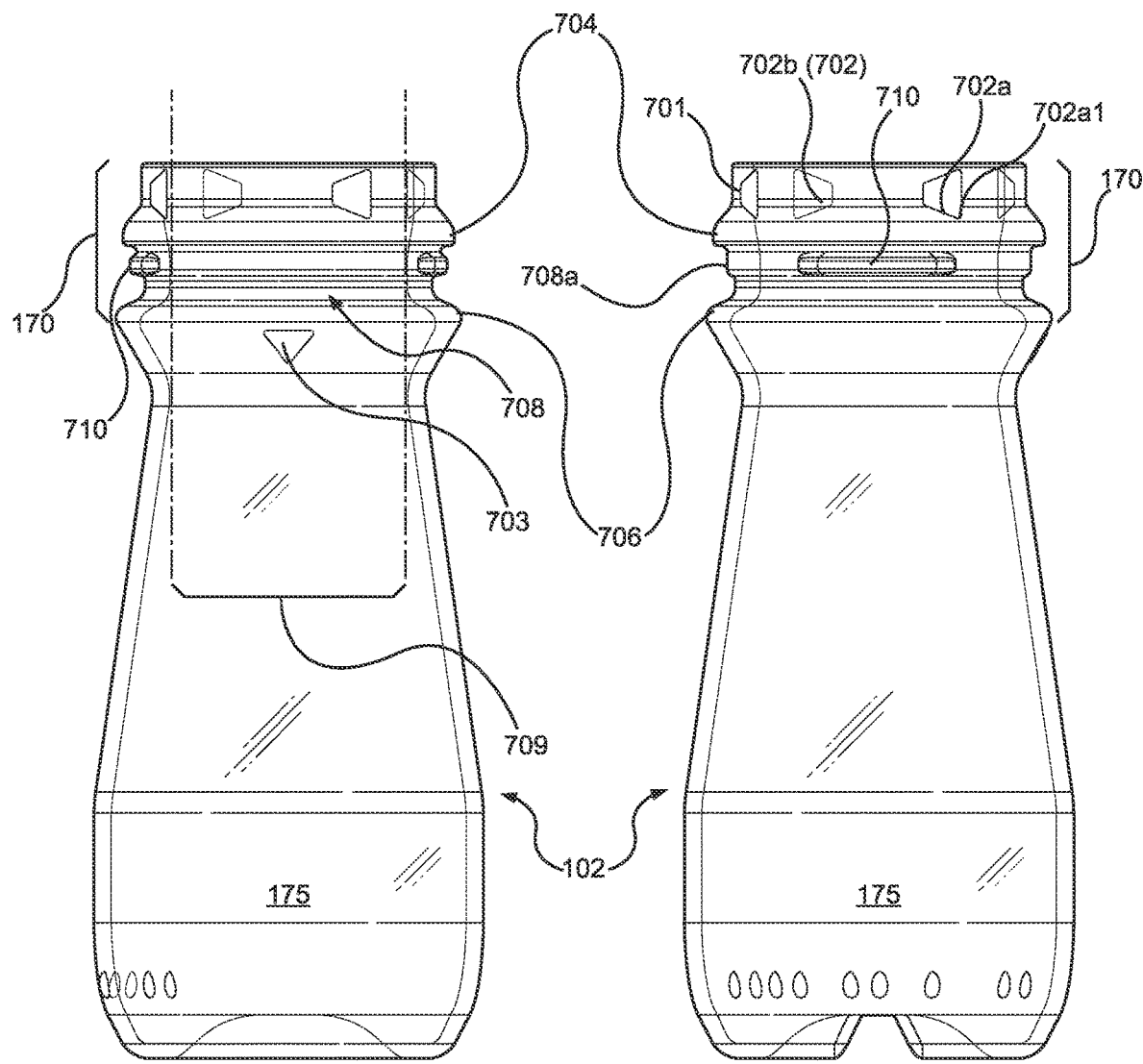
FIG. 7A is an exemplary front perspective view of a container of the grinder device, according to non-limiting embodiments of the present application.
FIG. 7B is an exemplary rear perspective view of the container shown in FIG. 7A, according to non-limiting embodiments of the present application.

As also shown in FIGS. 5A and 5B, the grinder housing 140 includes on the inner circumferential surface 144 thereof at least two lock protrusions 404 disposed at a lower side of the grinder housing 140. The lock protrusions 404 are disposed radially (in a rotation direction of the cap assembly 101) along the inner circumferential surface 144 at spaced intervals (for example, offset 1800 from each other along the inner circumferential surface 144). It is noted that one of the lock protrusions 404 is positioned inside of the grinder housing 140 directly opposite the cap assembly alignment indicator 402 positioned on the outside of the grinder housing 140.

Each lock protrusion 404 includes a radially curved lock projection 404a that extends in the rotation direction (of the cap assembly 101) and a plurality of axially extending finger projections 404b that project downward in the axial direction from a lower side of the curved lock projection 404a toward the container 102. The finger projections 404b are inclined downward from an inner radial side of the curved lock projection 404a toward the inner circumferential surface 144 of the grinder housing 140. Each finger projection 404b includes a sliding contact surface 405 configured to contact and slide over one or more portions of the annular neck 170 of the container 102 as will be discussed in further detail below. The lock protrusions 404 also serve to increase rigidity of the grinder housing 140 to increase durability and reliability, for example, during repeated grinding and cap assembly removal/attachment operations.

<Annular Neck>

The annular neck 170 includes the upper ring section 702, the upper annular shoulder 704, a lower annular shoulder 706, and a recessed groove 708 defined between the upper and lower annular shoulders 704, 706 disposed in an axial direction of the container 102, which coincides with the axial direction of the cap assembly 101 when attached to the container 102. As shown, for example, in FIGS. 2B, 3B, 4A, 4B, 7A, 7B, 8A and 8B, the recessed groove 708 is configured to accommodate therein the lock protrusions 404 of the grinder housing 140 such that the lock protrusions 404 project radially inward into the recessed groove 708 while being rotatable relative to the same when the cap assembly 101 is attached to the container 102.

The recessed groove 708 includes at least two lock beads 710 that project radially outward at spaced intervals from an outer circumferential surface 708a of the recessed groove 708. In embodiments, the spacing between lock beads 710 in the circumferential direction of the recessed groove 708 is at least a length of the lock protrusions 404 in the circumferential direction of the grinder housing 140. While two lock beads 710 and two lock protrusions 404 are shown as being spaced by 180° on the outer circumferential surface 708a of the recessed groove 708 and the inner circumferential surface 144 of the grinder housing 140, respectively, additional lock beads and protrusions spaced at equal intervals in the circumferential direction are contemplated. As discussed in detail below, the lock beads 710 are provided to prevent removal of the cap assembly 101 when the lock protrusions 404 are radially aligned with (i.e., either directly face or at least partially overlap with) the lock beads 710 in the radial direction of the cap assembly 101.

<Closure>

Figure 8A:
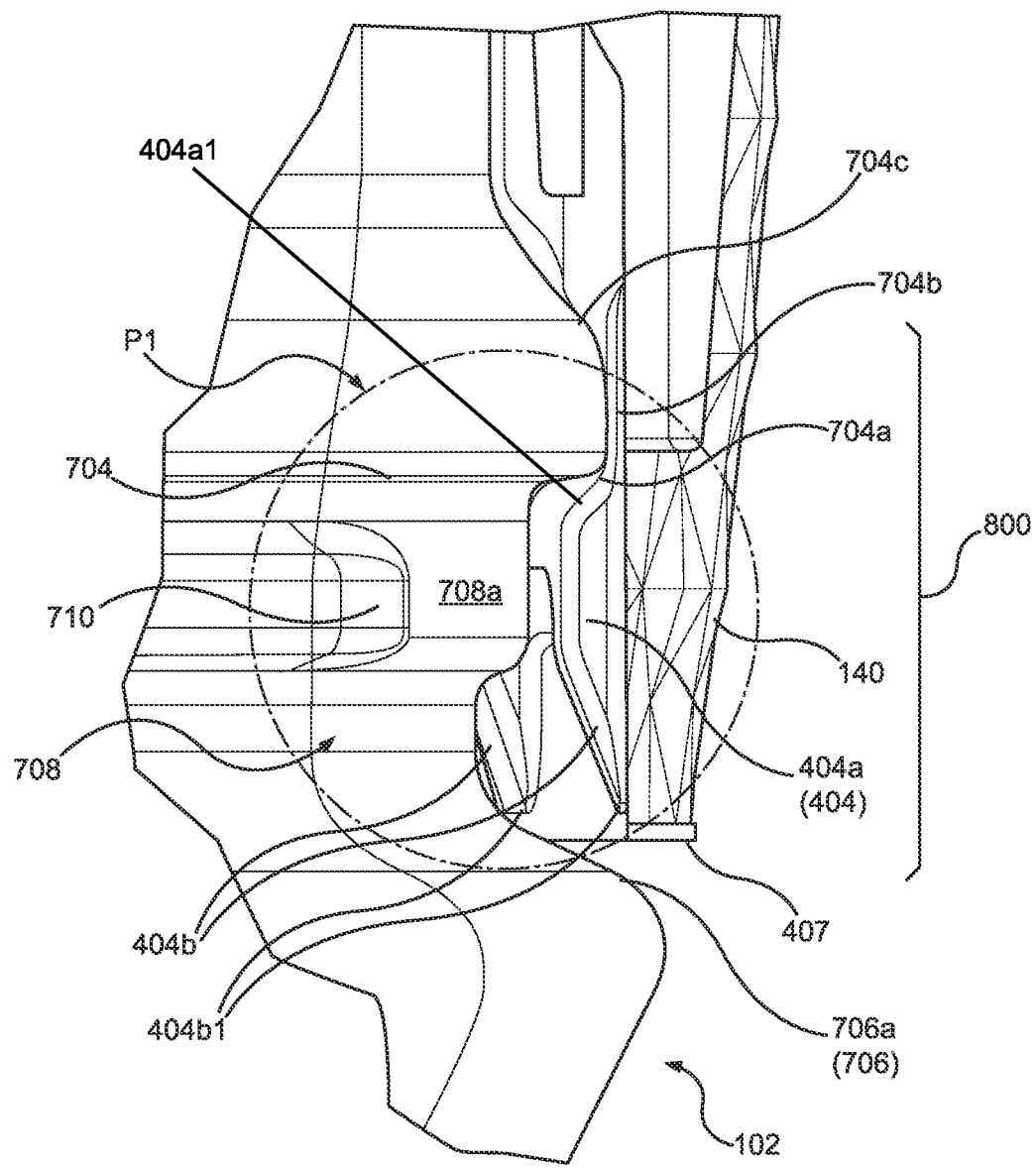
FIG. 8A is an exemplary partial cross-sectional view of a closure in a cap assembly removal position, according to non-limiting embodiments of the present application.
Figure 8B:
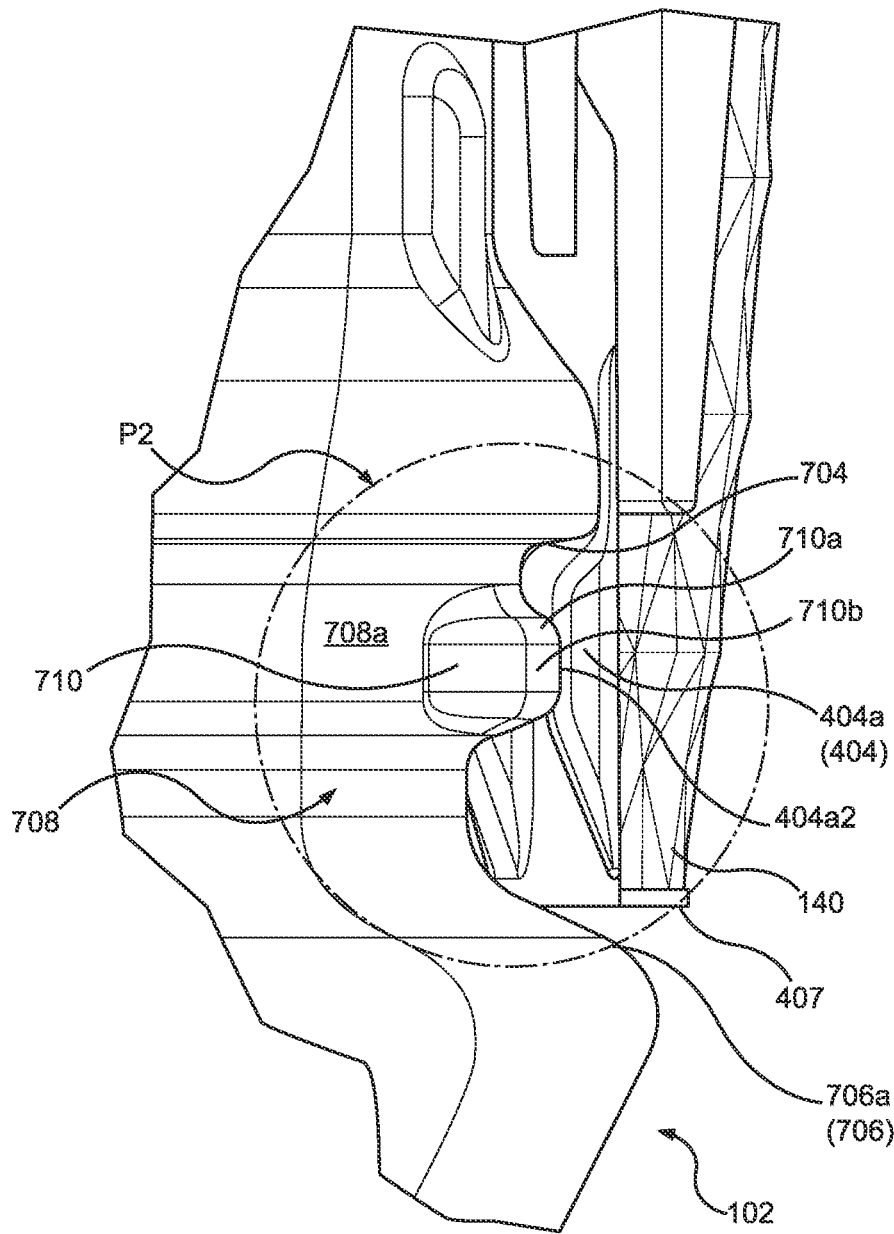
FIG. 8B is an exemplary partial cross-sectional view of a closure in a cap assembly locked position, according to non-limiting embodiments of the present application.

FIGS. 8A and 8B show exemplary partial cross-sectional views of the closure 800 for the grinder device 100 in the cap assembly removal position P1 and the cap assembly locked position P2. In particular, the grinder housing 140 of the cap assembly 101 and the annular neck 170 of the container 102 define the closure 800. As will be explained below, the closure 800 restricts the cap assembly 101 from being removed from the container 102. As will be described below, when certain conditions exist between parts of the grinder housing 140 and the annular neck 170, removal of the cap assembly 101 from the container 102 is permitted, locking of the cap assembly 101 to the container 102 is permitted, and attachment of the cap assembly 101 to the container 102 is permitted.

<Operations>

Operations for removal of, locking, and attaching the cap assembly 101 to the container 102 will now be described with reference to FIGS. 2A-3B and 8A-10B.

FIGS. 2B and 8A show the cap assembly 101 and the container 102 in the cap assembly removal position P1. FIG. 8A is a magnified partial cross-sectional view of the closure 800 for the grinder device 100 illustrating the relationship between the lock protrusion 404 of the grinder housing 140 and the lock bead 710 of the annular neck 170 in the cap assembly removal position P1.

<Removal Operation—Part I: Initiation of Separation>

Following a spice grinding operation, for example, it may be desirable to remove the cap assembly 101 from the container 102 to re-fill the contents of the container 102 or inspect one or both of the cap assembly 101 and the container 102. In such a situation, one or both of the cap assembly 101 and the container 102 are rotated such that the cap assembly alignment indicator 402 (provided on the grinder housing 140) is aligned with the container alignment indicator 703 in the vertical direction along the rotation axis 101a of the cap assembly 101. In this position (in the cap assembly removal position P1), and as shown in FIGS. 2B and 8A, the lock protrusions 404 provided on the inner circumferential surface 144 of the grinder housing 140 are positioned in a space (an annular gap 709) between the lock beads 710 in the recessed groove 708. The annular gap 709 can also be seen in FIG. 7A.

Removal of the cap assembly 101 from the container 102 may be performed while the cap assembly 101 is in a variety of assembled states, e.g., with or without the cover 120 attached thereto, and with the grind adjuster 130 set to any one of the grind settings. In embodiments, the preferred assembled state of the cap assembly 101 is a state in which the cover 120 is removed from the cap assembly 101 and the grind adjuster 130 is set to the fine grind setting. Such an assembled state minimizes the height of the cap assembly 101 for easy removal and minimizes potential damage to the component parts susceptible to separation forces acting on the cap assembly 101 during removal. It is noted that removal of the cover 120 and adjustment of the grind adjuster 130 may be performed (if at all) before or after the cap assembly 101 and the container 102 are positioned in the cap assembly removal position P1.

Figure 9:
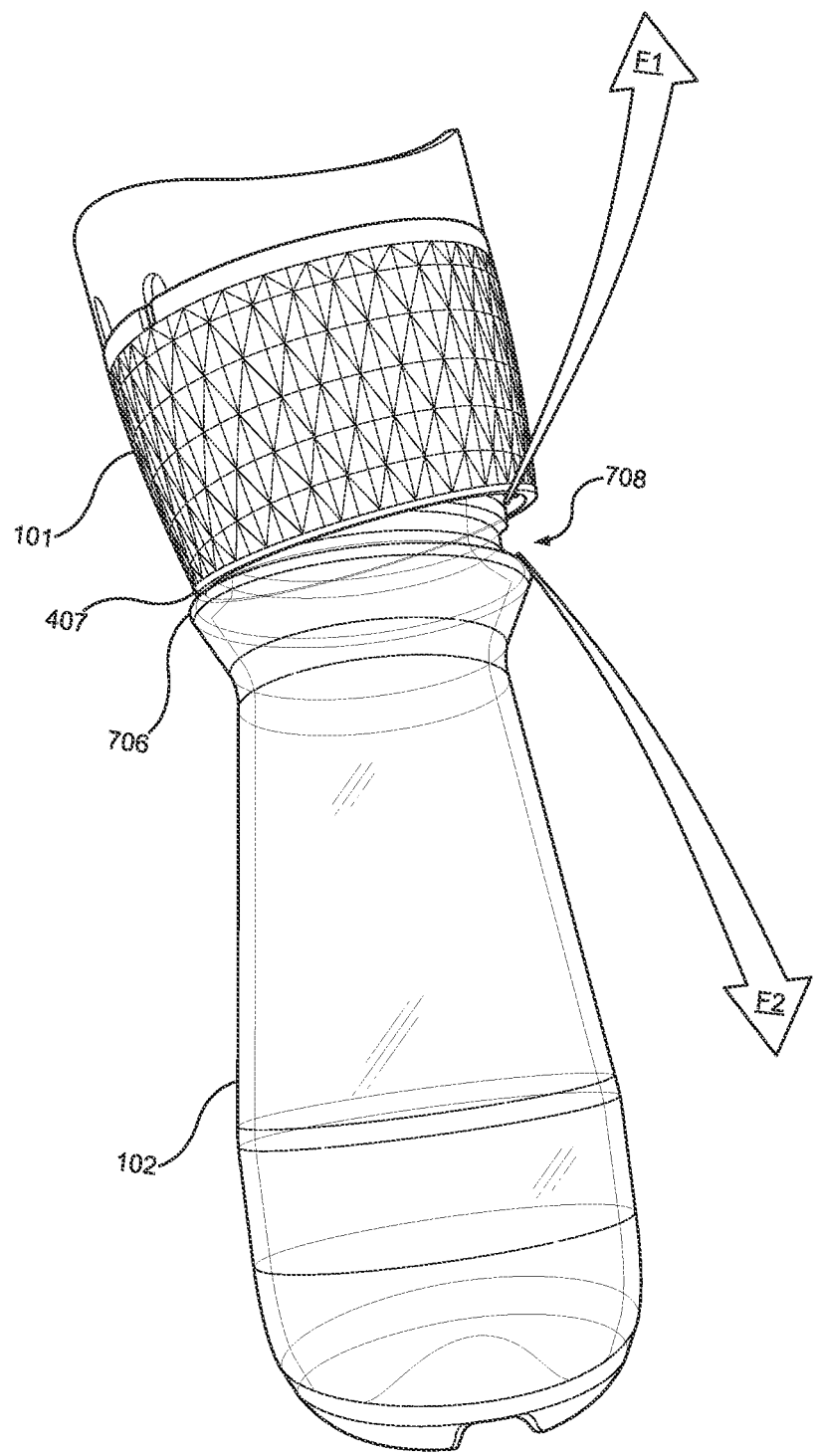
FIG. 9 is an exemplary side perspective view of a grinder device showing a separation force acts on a cap assembly and a container of the grinder device.

Once the cover 120 is removed (or prior to removal of the cover 120), the grind adjuster 130 is set to the fine grind setting, and the cap assembly 101 and the container 102 are positioned in the cap assembly removal position P1, the cap assembly 101 and the container 102, as shown in FIG. 9 (with the grinder device 100 generally oriented in a horizontal position with the alignment indicators 402, 703 positioned upward), each receive a separation force F1, F2 (a combination of opposite lateral pulling and downward bending forces) to remove the lock protrusion 404 from the recessed groove 708.

In particular, with sufficient pulling and bending force, an upper surface 404a1 of the lock projection 404a (on the inner circumferential surface 144 of the grinder housing 140) contacts a lower surface 704a of the upper annular shoulder 704 such that the lock projection 404a is slidable upwardly and radially outwardly toward an outermost circumferential edge 704b of the upper annular shoulder 704. The separation force F1, F2, coupled with the resistance from the rigid container 102, resiliently deforms the grinder housing 140 so that the lock protrusion 404 is removed from the recessed groove 708 as shown in FIG. 9. Thereafter, a lower side 404b1 of each of the finger projections 404b then abuts an upper surface 704c of the upper annular shoulder 704 such that the cap assembly 101 is effectively fixed (biased) in a tilted upward position on the container 102. In this position and as shown, for example, in FIGS. 10A and 10B, the recessed groove 708 (previously covered by the side of the grinder housing 140 including the indicator 402) is exposed on the grinder device 100.

It is noted that due to the friction-fit nature of the cap assembly 101, an audible "pop" sound is made as the lock projection 404a makes contact and transitions (slides along the annular neck 170) from below the lower surface 704a to clearing the outermost circumferential edge 704b of the upper annular shoulder 704.

Figure 10A:
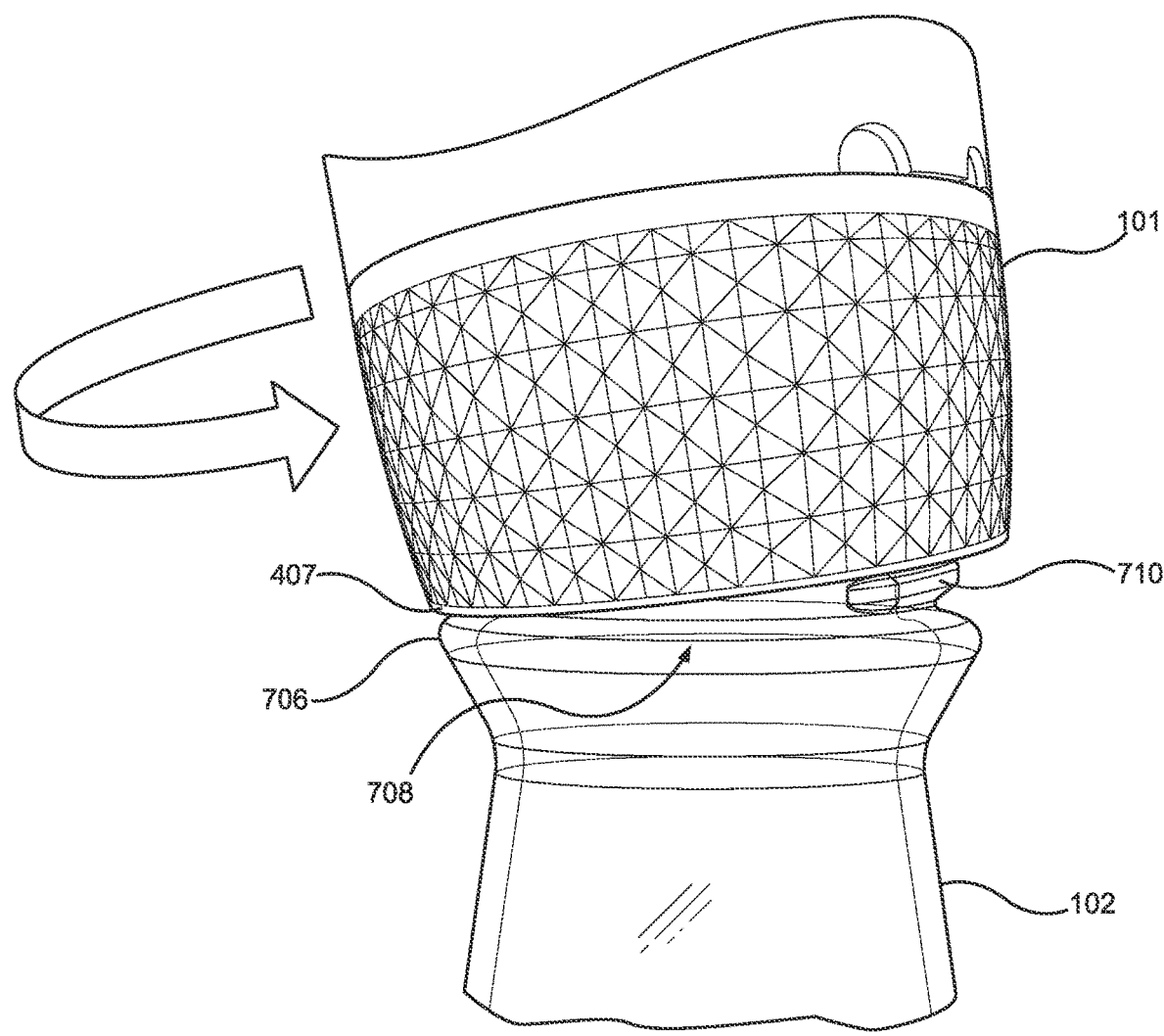
FIG. 10A shows an exemplary side perspective view of a cap assembly in a tilted upward position for initiating separation with a container.
Figure 10B:
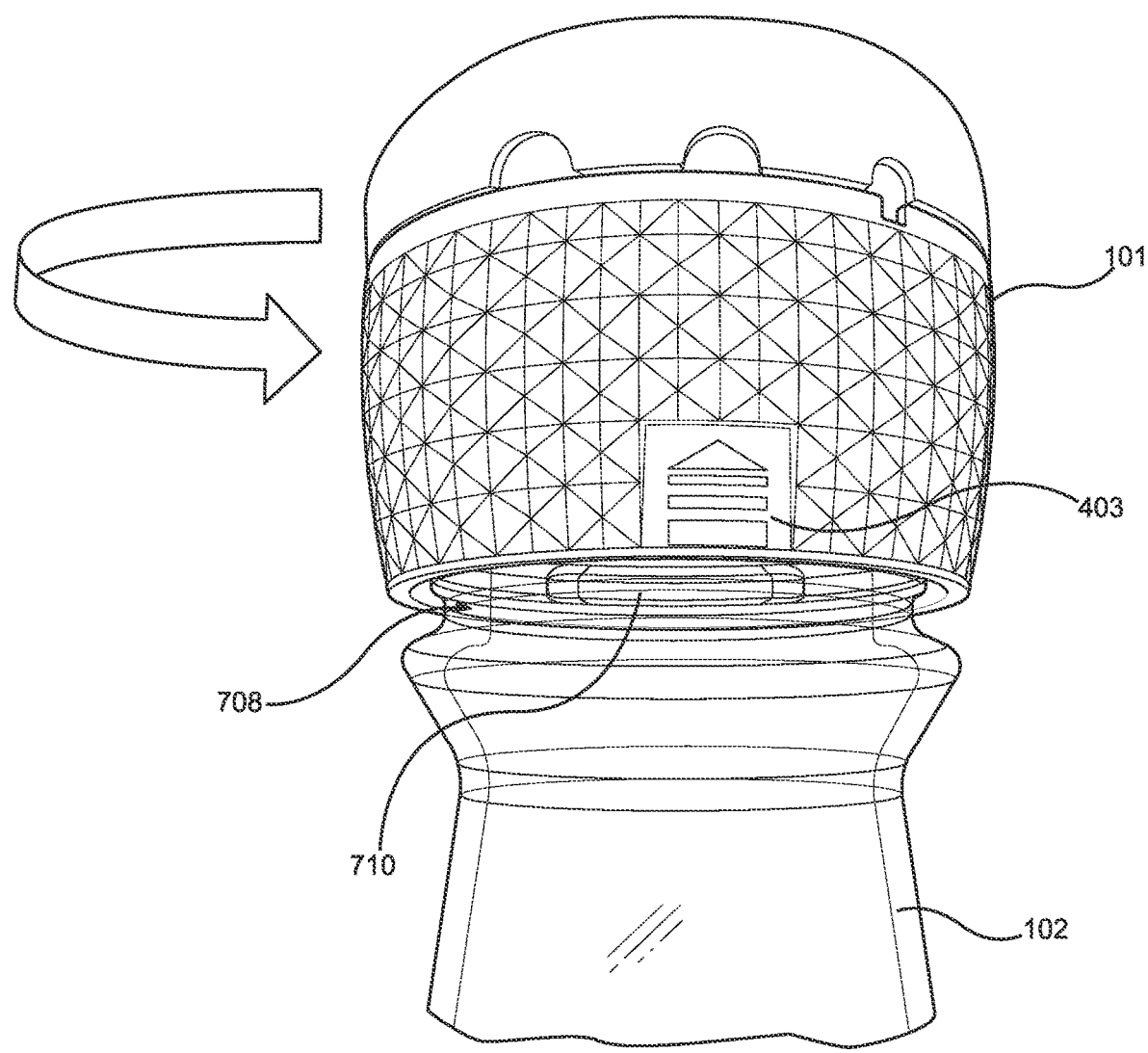
FIG. 10B shows an exemplary front perspective view of the cap assembly shown in FIG. 10A.

Meanwhile, on the opposite side of the cap assembly 101, a lower peripheral rim portion 407 of the grinder housing 140 is urged into and abuts an upper surface 706a of the lower annular shoulder 706 so as to restrict the cap assembly 101 from being removed from the container 102. In particular and as shown in FIG. 10A, while the indicator 402 side of the grinder housing 140 (i.e., the cap assembly 101) is lifted, the opposite side of the grinder housing 140 is necessarily forced downward and inward back towards the upper surface 706a of the lower annular shoulder 706.

Therefore, the lower peripheral rim portion 407 of the grinder housing 140 (on the opposite side of the cap assembly 101 receiving the separation force F1, F2) is urged toward and wedged into the recessed groove 708 below the lock bead 710 so as to contact the upper surface 706a of the lower annular shoulder 706. It is noted that the cap assembly 101 remains rotatable in this position.

While separation of the cap assembly 101 from the container 102 is initiated with this arrangement, removal of the opposite-side lock protrusion 404 (disposed opposite of the recess-removed lock protrusion 404) from the recessed groove 708 remains restricted in the recessed groove 708 to prevent complete separation of the cap assembly 101 from the container 102.

<Removal Operation—Part II: Separation>

To completely separate the cap assembly 101 from the container 102 for inspection and/or re-fill, once the indicator 402 side lock protrusion 404 is removed or displaced in the axial direction from the recessed groove 708, and the finger projections 404b abut the upper surface 704c of the upper annular shoulder 704, the cap assembly 101 is rotated, for example, 900, relative to the container 102.

As the cap assembly 101 is rotated, the recess-retained lock protrusion 404 (disposed on the opposite side of the recess-removed lock protrusion 404) contacts and slides along the lock bead 710 in the rotation direction of the cap assembly 101. Due to the rigid nature of the container 102 and the resilient flexibility of the grinder housing 140, the contact between the lock protrusion 404 and the lock bead 710 further resiliently deforms the grinder housing 140 and pushes the lock protrusion 404 radially outward such that when another separation force is received by both the cap assembly 101 and the container 102, the cap assembly 101 is separable from the container 102.

In particular, the deformation of the grinder housing 140 enables a radially inner-most circumferential edge 404a2 of the lock projection 404a to slide upwardly and radially outward from a radially outermost circumferential edge 710b of the lock bead 710 in the direction of the upper surface 710a of the lock bead 710.

At the point that the inner-most circumferential edge 404a2 of the lock projection 404a and the outermost circumferential edge 710b of the lock bead 710 contact, the lock projection 404a is sufficiently spaced in the radial direction to be able to, as a separation force is again applied to the cap assembly 101 and the container 102, contact the lower surface 704a of the upper annular shoulder 704 and further slide upwardly and radially outward from the outer-most circumferential edge 704b until the grinder housing 140 is sufficiently deformed to permit the lock protrusion 404 to slide off of the upper annular shoulder 704 and "pop" the cap assembly 101 off of the container 102.

The arrangement and subsequent manipulations of the various components of the cap assembly 101 relative to the container 102, as described above, ensure that the removal of the cap assembly 101 from the container 102 is deliberate, and not inadvertent. The arrangement also prevents the unintentional spillage of the contents of the container 102, maintains freshness and shelf life of the contents contained in the container 102, minimizes tampering of the grinder device 100 via quick visual inspection by the user, and prevents grind adjustments/grinding operations when the cap assembly 101 is not securely assembled to the container 102.

<Locked State>

For spice grinding operations, general handling, storage, and transport of the grinding device 100, it is desirable to prevent removal of the cap assembly 101 from the container 102. In such a situation and as shown in FIGS. 3B and 8B, one or both of the cap assembly 101 and the container 102 are rotated such that the cap assembly alignment indicator 402 is offset from, and does not align with, the container alignment indicator 703 in the vertical direction along the rotation axis 101a of the cap assembly 101. In this position (in the cap assembly locked position P2), the lock protrusion 404 provided on the inner circumferential surface 144 of the grinder housing 140 is offset from the annular gap 709 and faces the lock bead 710 in a position radially outward from the same. If a separation force is generated to separate the cap assembly 101 from the container 102, such separation is prevented. It is noted that any separation force capable of separating the cap assembly 101 from the container 102 while in the cap assembly locked position P2 is greater than any separation force capable of separating the cap assembly 101 from the container 102 while in the cap assembly removal position P1.

In particular, if a separation force is generated and acts to separate the cap assembly 101 from the container 102, the curved lock projection 404a (of the side of the lock protrusion 404 receiving the force) contacts the lower surface 704a of the upper annular shoulder 704 and becomes wedged in the recessed groove 708 between an upper surface 710a of the lock bead 710 and the lower surface 704a of the upper annular shoulder 704. Meanwhile, the other curved lock projection 404a (of the lock protrusion 404 on the other side of the grinder housing 140) is pressed downward and inward such that the inner-most circumferential edge 404a2 contacts into the outer-most circumferential edge 710a of the lock bead 710 and the lowermost peripheral rim 407 is urged into contact with the upper surface 706a of the lower annular shoulder 706.

Such arrangement does not provide sufficient spacing for the lock protrusion 404a on the one side receiving the separation force to slide upwardly and radially outwardly toward the outermost circumferential edge 704b of the upper annular shoulder 704 (and for the lock protrusion 404a on the other side to clear or slide downwardly from the outer-most circumferential edge 710a of the lock bead 710) thereby preventing the cap assembly 101 from being removed from the container 102. In other words, the arrangement prevents the cap assembly 101 from obtaining the tilted upward position necessary to complete removal and separation of the cap assembly 101 from the container 102 thereby effectively locking the cap assembly 101 to the container 102.

In addition, because the lock protrusions 404 (lock projections 404a) face the lock beads 710 in a position radially outward from the same, the lock beads 710 interfere with the ability of the grinder housing 140 to resiliently deform in a manner necessary for the cap assembly 101 to clear the upper annular shoulder 704. This arrangement effectively locks the cap assembly 101 to the container 102 and the cap assembly 101 and the container 102 remain in the cap assembly locked position P2 for grinding operations, general handling, storage, and transport of the grinding device 100.

<Attachment Operation>

Because of the resilient deformability of the grinder housing, as well as downward inclined nature of the finger projections 404b toward the lowermost peripheral rim 407, attachment of the cap assembly 101 to the container 102 can be simply performed with a downward force of the cap assembly 101 while in an upright position where the lowermost peripheral rim 407 of the grinder housing 140 faces the upper rim 701 of the annular neck 170 (without regard to alignment of the indicators 404, 703). During the attachment operation, as the cap assembly 101 is lowered onto the container 102, the lowermost peripheral rim 407 contacts the upper surface 704c of the upper annular shoulder 704. With sufficient downward force, the grinder housing 140 resiliently deforms outward radially such that the sliding contact surface of each finger projection 404b contacts and slides over the upper annular shoulder 704 to permit the cap assembly 101 to securely attach to the container 102 with the lock protrusions 404 extending as intended into the recessed groove 708 either in the area of the annular gap 709 or facing the lock beads 710.

Although the grinder device and closure have been described with reference to several exemplary embodiments, it is understood that the words that have been used are words of description and illustration, rather than words of limitation. Changes may be made within the purview of the appended claims, as presently stated and as amended, without departing from the scope and spirit of the engagement and disengagement of the closure or the connection and separation of the cap assembly from the container as depicted herein. Although the grinder device and closure have been described with reference to particular means, materials and embodiments, such descriptions of the same are not intended to be limited to the particulars disclosed; rather the concepts of the grinder device and closure described herein extend to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope and spirit of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure complies with the relevant patent rules and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A grinder device comprising:
a container;
a cap assembly configured to be friction-fit to the container such that the cap assembly is removably lockable to the container, the cap assembly including:
a grinder housing; and
a grinding mill disposed within the grinder housing and configured to perform a grinding operation of condiment disposed in the container;
wherein:
the cap assembly is moveable relative to the container between:
a removal position in which the cap assembly is at least partially separable from the container when opposing, longitudinal separation forces are applied to the cap assembly and the container; and
a locked position in which the cap assembly is not separable from the container when the opposing, longitudinal separation forces are applied to the cap assembly and the container.

2. The grinder device of claim 1, wherein:
the container includes a container alignment indicator;
the cap assembly includes a cap assembly alignment indicator; and
the cap assembly alignment indicator and the container alignment indicator are aligned with each other while the cap assembly is in the removal position.

3. The grinder device of claim 1, wherein the grinder housing includes a plurality of lock protrusions that extend radially from an inner circumferential surface of the grinder housing.

4. The grinder device of claim 3, wherein:
each lock protrusion of the plurality of lock protrusions includes a plurality of finger projections that are tapered towards a first peripheral rim of the grinder housing; and
the plurality of finger projections are configured to contact and slide over an annular neck of the container to permit attachment of the cap assembly to the container.

5. The grinder device of claim 3, wherein:
the container includes a recessed groove configured to accommodate the plurality of lock protrusions to secure the cap assembly to the container while permitting relative rotation between the cap assembly and the container; and
the recessed groove includes a plurality of lock beads that project radially outward from an outer circumferential surface of the recessed groove.

6. The grinder device of claim 5, wherein:
when the cap assembly and the container are in the locked position, the lock protrusions of the grinder housing are radially aligned with the lock beads of the container; and
when the cap assembly and the container are in the removal position, the lock protrusions of the grinder housing are offset from the lock beads of the container.

7. The grinder device of claim 6, wherein when the cap assembly is secured to the container and the opposing, longitudinal separation forces are applied to the cap assembly and the container while in the removal position:
a first set of the plurality of lock protrusions of the cap assembly move from the recessed groove to a first position in which the first set of lock protrusions contact an upper annular shoulder of the container; and
a second set of the plurality of lock protrusions of the cap assembly remain within the recessed groove.

8. The grinder device of claim 7, wherein when the cap assembly is secured to the container and the opposing, longitudinal separation forces are applied to the cap assembly and the container while in the locked position:
- the first set of lock protrusions remain within the recessed groove; and
- the second set of lock protrusions remain within the recessed groove.

9. A container of a spice grinding device, the container comprising:
- a base at least partially defining a chamber configured to receive a condiment; and
- an annular neck that is couplable to a cap assembly that is configured to grind the condiment, the annular neck including an upper annular shoulder, a lower annular shoulder, and a recessed groove defined between the upper and lower annular shoulders;

wherein:
- the recessed groove includes a plurality of lock beads that project radially outward from an outer circumferential surface of the recessed groove;
- the recessed groove is configured to accommodate a plurality of lock protrusions from the cap assembly to secure the cap assembly to the container while permitting relative rotation of the cap assembly and the container between:
  - a locked position in which the lock protrusions are radially aligned with the lock beads; and
  - a removal position in which the lock protrusions are offset from the lock beads; and
- when the cap assembly is secured to the container and opposing separation forces are applied to the cap assembly and the container:
  - the cap assembly and container are at least partially separable while in the removal position; and
  - the cap assembly and container are not separable while in the locked position.

10. The container of claim 9, wherein when the cap assembly is secured to the container and opposing separation forces are applied to the cap assembly and the container while in the removal position:
- a first set of the plurality of lock protrusions of the cap assembly move from the recessed groove to a first position in which the first set of lock protrusions contact the upper annular shoulder of the annular neck; and
- a second set of the plurality of lock protrusions of the cap assembly remain within the recessed groove.

11. The container of claim 10, wherein when the cap assembly is secured to the container and opposing separation forces are applied to the cap assembly and the container while in the removal position:
- an upper surface of the lower annular shoulder abuts a lower peripheral rim portion of the cap assembly.

12. The container of claim 10, wherein when the cap assembly is secured to the container and opposing separation forces are applied to the cap assembly and the container while in the locked position:
- the first set of lock protrusions remain within the recessed groove; and
- the second set of lock protrusions remain within the recessed groove.

13. The container of claim 9, wherein:
- the container includes a container alignment indicator; and
- while the cap assembly and the container are in the removal position, the container alignment indicator is aligned with a cap assembly alignment indicator.

* * * * *